United States Patent [19]
Rottner et al.

[11] Patent Number: 5,665,950
[45] Date of Patent: Sep. 9, 1997

[54] FAT BIT BAR CODE READER

[75] Inventors: Bruce E. Rottner, Rochester; Kenneth Alan Lindsay, Jr., Brockport; William Joseph Clare, Bergen, all of N.Y.

[73] Assignee: Eastman Kodak Company, Rochester, N.Y.

[21] Appl. No.: 453,434

[22] Filed: May 30, 1995

[51] Int. Cl.$^6$ .................................................... G06F 17/00
[52] U.S. Cl. .............................................. 235/375; 235/462
[58] Field of Search ...................................... 235/462, 375

[56] References Cited

U.S. PATENT DOCUMENTS

| | | |
|---|---|---|
| 3,663,803 | 5/1972 | Mohan et al. . |
| 4,707,120 | 11/1987 | Yamamoto . |
| 5,122,645 | 6/1992 | Saeki et al. . |
| 5,128,519 | 7/1992 | Tokuda . |
| 5,164,574 | 11/1992 | Ujiie et al. . |
| 5,212,367 | 5/1993 | Takenaka . |
| 5,268,562 | 12/1993 | Lazaridis . |

*Primary Examiner*—Harold Pitts
*Attorney, Agent, or Firm*—Nixon, Hargrave, Devans & Doyle

[57] ABSTRACT

A reader for reading bar code symbols containing so called "fat bits" arranged on exposed film is described. A strip of film 10 which has one or more frames 11 has a boundary edge 13 with space in which zero, one, or two fat bits 14 is provided for each frame 11. A light source 28 directs light through the boundary edge 13 of the strip 10. A pair of optical sensors 25, 27 receives the light directed through the boundary edge 13. The sensors 25, 27 each output a signal corresponding to the presence or absence of a fat bit to a detector circuit 220. The detector circuit 220 outputs a signal corresponding to the fat bit to a controller 250 as the strip moves between the light source 28 and the sensors 25, 27. An encoder 230 measures the displacement of the strip 10 as it moves, and outputs pulse signals to the controller 250 representative of units of strip 10 displacement. The controller 250, while receiving the output from the detector circuit 220, measures the width of the fat bit 14 by translating the pulse signals from the encoder 230 into signals representative of the width of the fat bit. The presence of valid fat bits is then verified where the measured width of the fat bits is within a certain range indicative of a valid fat bit. The reader also reads the DX code 12 for each frame 11 on edge 13 by outputting signals from the pair of optical sensors 25, 26 to the detector circuit 220 representative of received light directed through the boundary edge 13 corresponding to the DX code 12 bits. The controller 250 then measures the width of each DX code 12 bit in the same manner as fat bits 14 using the pulse signals from encoder 230 while receiving from the detector circuit 220 output indicative of a DX code 12 bit. The measured DX code 12 bit widths are then stored in controller 250 for later decoding. Sensors 25 and 26 are spaced from each other to optimize reading of DX code 12, while sensors 25 and 27 are spaced from each other by less than the minimum width of a fat bit 14. The width of the fat bit 14 is substantially greater than the width of bars representing DX code 12 bits.

17 Claims, 6 Drawing Sheets

FAT BIT BAR CODE READER

FIELD OF INVENTION

The present invention relates generally to an apparatus and method for reading bar codes imaged on photographic film (also known as film codes), and particularly, to reading bar code bits imaged on photographic film after manufacture, such as in a camera or other reprographic.

BACKGROUND OF THE INVENTION

Existing film code readers are designed to read a 23-bit, two track DX bar code which is imaged on the edge of 35 mm film during film manufacture. The DX code provides information about the manufactured film, including type, speed, and manufacture. The DX code information is conventionally used in calculating exposure time when the film is printed. This DX code has a 0.015" minimum bar width, a clock and data track, a start and end sentinel, and a parity bit. All these features are used to verify and assure the validity of the DX code when read. A reader for DX code is optimized to read the code, provided that there are sharp transitions in density or contrast between the film background and DX code. This contrast is visible as the darkness of the code with respect to the background.

A problem with the DX code is that it is limited to film information existing at the time of manufacture. Additional information is often desired as to parameters designated by the user of the film for printing negatives of developed film that can only be available after manufacture. Additional bar codes may be exposed on the film while in a camera to overcome this problem. These codes have bar widths three or four times greater than DX codes, and hence are called fat bits. However, due to the uncontrolled environment of a camera, as compared to the environment during film manufacture, the density, integrity, size and shape of the fat bits vary greatly making reading difficult. Reading of fat bits is further made difficult because any imperfections as may be caused by debris, scratches, edge fog, chemical stains during the film developing process, etc... can adversely effect exposed fat bits, or create false fat bits. The above conditions make reading fat bits difficult for conventional DX code readers.

SUMMARY OF THE INVENTION

It is a principal object of this invention to provide an improved code reader for reading reliably a fat bit code exposed in a camera along the edge of the film, which accommodates imperfections on the film and code as may be caused by variations in code density, debris, chemical stains, edge fog, and film scratches.

It is another object of this invention to provide an improved code reader capable of reading reliably DX codes, and fat bit codes exposed in a camera.

Briefly described, a reader is provided in accordance with the invention capable of reading fat bits on exposed developed film having a strip of film with one or more frames, and a boundary edge having sufficient space for holding zero, one, or two fat bits for each frame. The reader includes a light source for directing light through the strip and a pair of optical sensors for receiving light from said light source passing through the edge. The sensors each provide an output signal corresponding to the intensity of the received light representative of the presence or absence of the fat bit in the space along the edge. The sensors are spaced apart. Means is provided for moving the edge of the strip along a path extending across the sensors. The path is located between the light source and the sensors. Means responsive to the output signals from the sensors is provided for measuring the width of each fat bit as the strip is translated across the sensors. Means is then provided for verifying that the measured width is within a range expected for a valid fat bit. The reader may also have means for counting the number of verified fat bits.

In accordance with a still further object of the invention, there is provided a reader for reading bar codes on a strip of film with one or more frames, and a boundary edge having first and second regions containing respectively first and second codes thereon, with each code having bits of different widths, and the second code having a controlled width. The reader includes a light source for directing a beam of light on the edge of the strip, and first, second, and third sensors for receiving the beam via the strip from the light source. Each sensor provides a signal corresponding to the received light at the respective sensor. Means is provided for moving the strip and sensors with respect to each other, preferably, the strip moves past fixed sensors so that the edge of the strip passes across the sensors and between the light source and the sensors. The first sensor is spaced from the second sensor by a distance less than the width of the bits of the first bar code, while the first sensor is spaced from the third sensor by a distance less than the width of the bits of the second bar code. Means is provided for measuring the width of each bit of the first bar code responsive to the first and second sensor signals, which correspond to the received light representing the first code bits, when the first region of the edge containing the first bar code moves across the first and second sensors, and measuring the width of each bit of the second bar code responsive to the first and third sensor signals, which correspond to the received light representing the second code bits, when the second region of the edge containing the second bar code moves across the first and third sensors. The reader also includes means for verifying that the width of the second bar code bits are within a range of a valid bit of the second bar code.

The foregoing and other objects feature and advantages of the present invention will become more apparent upon reading of the following description in connection with the accompanying drawings wherein like reference numerals indicate like parts.

DETAILED DESCRIPTION OF THE INVENTION

Figure 1:
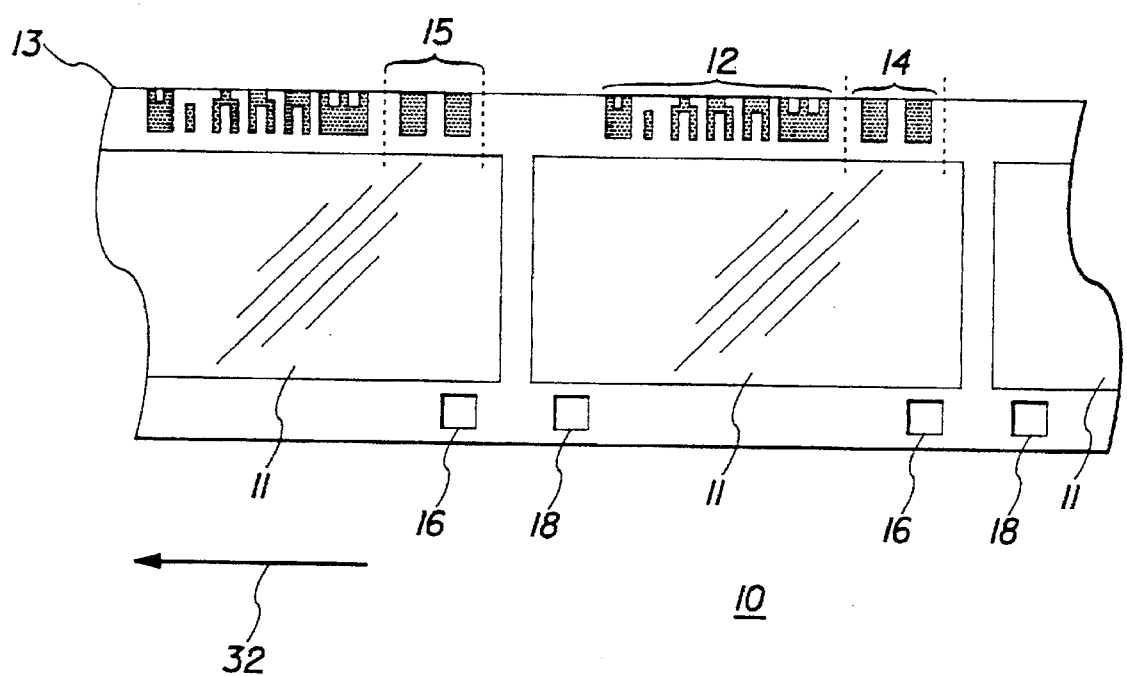
FIG. 1 is an illustration of a film strip having DX coding and fat bits.

FIG. 1 shows an example of a partial strip 10 of exposed developed film having a DX code 12 and a fat bit 14 code. Each frame 11 of the strip 10 has a boundary edge 13 having two regions, one for the DX code 12, and the other for the fat bit 14 code. There can be zero, one, or two fat bits 14 exposed for each frame 11. For illustrative purposes, FIG. 1 shows two fat bits. The size or width of each fat bit 14 is at least 3.4 times the minimum width of a bit (a bar) of the DX code 12, which nominally may be 0.015 inches.

The fat bits 14 are exposed on strip 10 when a frame 11 is exposed in a camera. The number of bits 14 exposed effectively stores information as to how the camera user desires the picture to be printed from a particular frame 11. The camera is designed to expose the appropriate number of fat bits 14 according to either user command or selected parameters, or a default condition for the particular type of camera. For example, the presence of zero, one or two fat bits 14 can convey information as to the aspect ratio used to print the negative in frame 11 associated with the fat bits 14 imaged. The number of fat bits 14 may refer to three different prim aspect ratio formats, such as a pan (3 inches× 10 inches or 4 inches×11 inches), HDTV (3 inches×6 inches or 4 inches×7 inches), and classic (3 inches×5 inches or 4 inches×6 inches).

As shown in FIG. 1, the fat bits 14 are exposed in a zone or region 15 to right of the DX code 12, shown by the dashed lines along the boundary edge 13. The fat bits 14 are exposed in this zone 15, which is indexed in the direction of the strip 10 with respect to the metering perforation 18 for the frame 11. Also, during film manufacture, the DX code 12 for each frame 11 is located in a region along the edge 13 which is indexed from the metering perforation 18 of the frame 11.

The environment in the camera exposing the fat bits 14 on the edge 13 is more variable, from camera to camera, as well as within the same camera, therefore, fat bits 14 will not have the consistent sharp density transitions as that of the DX codes 12. Density transitions refer to the fat bit's contrast with respect to the film background density of the edge 13. Further, imperfections in the film may be caused in the camera or in development of the film, such as debris, chemical stain, scratches, and edge fog may exist in the fat bit zone 15. Due to this variability in the fat bits 14 and film, and the absence of built-in code validity features in the fat bits 14, a standard DX reader may not be capable of reading both DX codes 12 and fat bit 14 codes with desired reliability.

Figure 2:
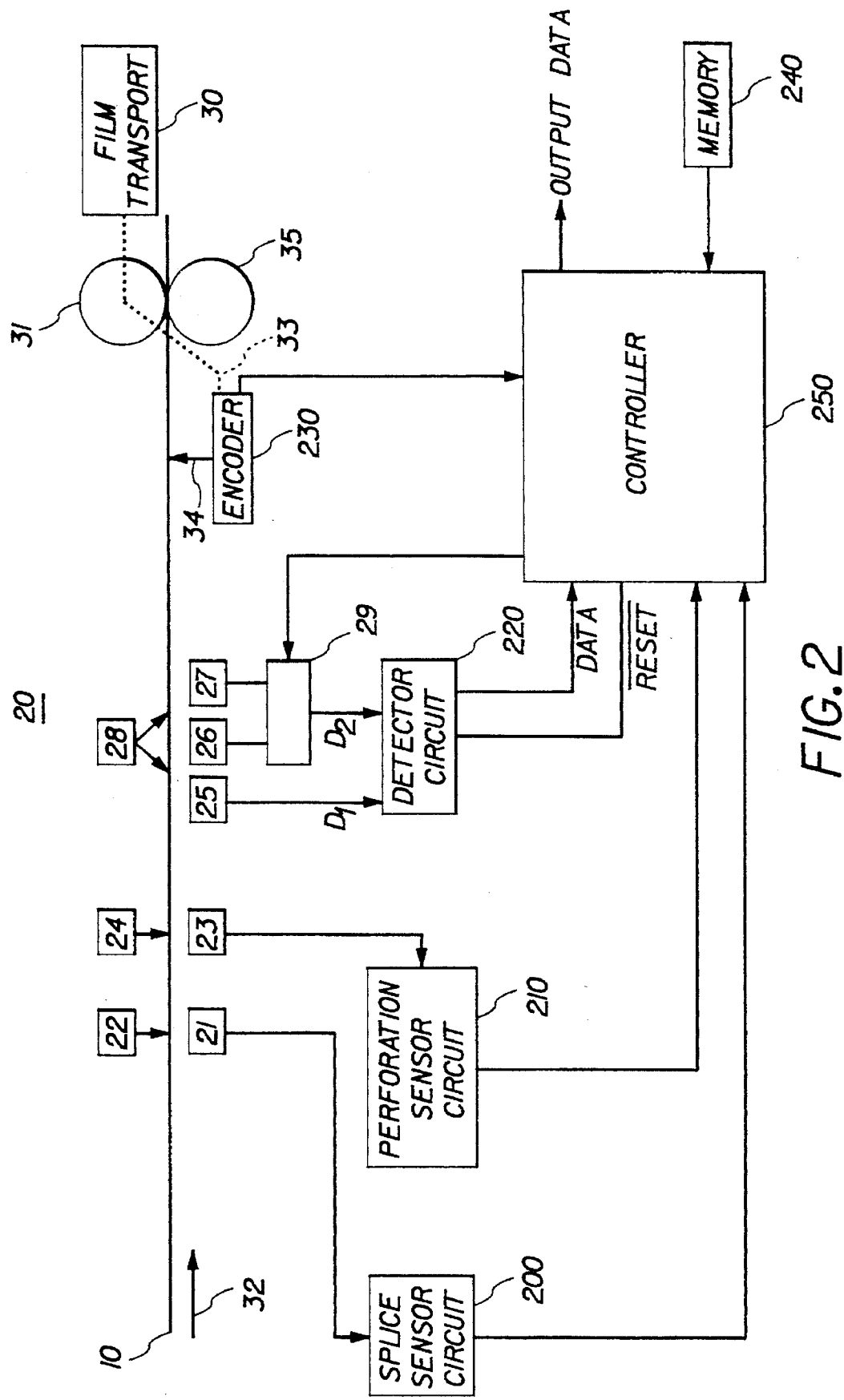
FIG. 2 is a block diagram of a reading system implementing the invention.

FIG. 2 is a block diagram of the system 20 implementing the invention which may be part of the printer which exposes sensitized paper on which prints are made from negatives within frames 11 after strip 10 is exposed and developed. The strip 10 (shown in side view) is moved by the film transport 30 mechanism across a series of sensors 21, 23, 25, 26, and 27. Film transport 30 mechanism includes a metering roller 31 attached to a motor shaft (not shown) for moving the strip 10 at a controlled velocity along a path 32, and a nip roller 35 for applying a force against strip 10 opposite metering roller 31. The strip 10 is oriented last frame first, so that along edge 13 for a given frame 11, the DX code 12 will pass the sensors before the fat bit zone 15. This orientation is shown by the arrow 32 in both FIGS. 1 and 2. The strip 10 may be a series of film orders, each film order being a separate roll of exposed developed film. Each order is connected by a splice, such as by connective tape.

As the strip 10 is transferred along the path 32, it first passes the splice sensor 21 which receives light directed from an LED 22 located on side of the strip opposite the splice sensor 21. The splice sensor 21 is a photo-diode located near the middle of the strip, and provides an electrical signal representative of the received light from the LED 22 to the splice sensor circuit 200. The splice sensor circuit 200 sends a signal to the controller 250, indicating whether a splice has passed across the splice sensor 21.

After passing the splice sensor 21, the strip 10 moves across the perforation sensor 23. The perforation sensor 23 is a photo-diode located such that the edge of the strip containing the perforations 16, 18 (see FIG. 1) passes across the sensor 23. The perforation sensor 23 receives pulses of light from an LED 24 located on the side of the strip opposite the perforation sensor as the perforations pass between the LED 24 and sensor 23. Sensor 23 generates electrical pulse signals representative of the received light. The perforation sensor circuit 210 receives the sensor signals and sends a signal to the controller 250 indicating when the perforations 16, 18, and particularly the metering perforation 18, has passed across the sensor 23. The metering perforations 18 are recognized in circuit 210 due to the relative timing of the pulses from sensor 23.

After passing the perforation sensor 23, the strip 10 is transferred across photo-detectors 25, 26, and 27. Photo-detectors 25, 26, and 27 overlie the edge 13 of the strip 10 containing the regions or zones having the DX code 12 and the fat bit 14 code. Photo-detectors 25, 26, and 27 receive light from an LED 28. The signals from photo-detectors 25, 26, and 27 are representative of the intensity of the received light from the LED 28 corresponding to density variations in strip 10.

Detector circuit 220 has two current inputs $D_1$ and $D_2$. Photo-detector 25 provides an electrical signal to the $D_1$ input of detector circuit 220, and photo-detectors 26 and 27 each provide a separate electrical signal to a multiplexer 29. A signal from controller 250 to multiplexer 29 selects the electrical signal from either photo-detector 26 or 27 to be sent to the $D_2$ input of detector circuit 220. During DX code 12 reading by system 20, the detector circuit 220 receives signals at its $D_1$ and $D_2$ inputs from the pair of photo-detectors 25 and 26, respectively, wherein controller 250 selects via multiplexer 29 to transmit photo-detector 27's signal to the $D_2$ input of the detector circuit 220. While during fat bit 14 code reading the detector circuit 220 receives signals at its $D_1$ and $D_2$ inputs from the pair of photo-detectors 25 and 27, respectfully, wherein controller 250 selects via multiplexer 29 to transmit photo-detector 26's signal to the $D_2$ input of the detector circuit 220. Photo-detectors 25 and 27, are spaced apart by a distance along the path 32 which is less than the minimum width of a fat bit 14. Photo-detector 26 is also spaced apart from photo-detector 25, but by a distance along path 32 which is optimized for DX code 12 reading. Preferably, this optimized distance is less than the width of a DX code 12 bit.

The detector circuit 220 sends an output DATA signals to the controller 250. The DATA are digitized signals which when at a high level, correspond to the interval between when the first sensor in path 32, photo-detector 25, detects reduced light intensity caused by a density increase along the edge 13, and when the second sensor in path 32, either photo-detector 26 or 27 depending on multiplexer 29's setting to the $D_2$ input, detects a like intensity reduction corresponding to the same density increase.

The detector circuit 220 is reset upon receiving a controller 250 output RESET signal, which occurs when a signal from the splice sensor circuit 200 indicates the presence of a splice in the strip 10. The operation of the detector circuit 220 to produce the DATA signal will be described in detail in reference to FIGS. 3 and 4.

An encoder 230 is provided in the system 20, which is coupled, as indicated by dash line 33, to the motor shaft of the metering roller 31. The encoder 230 monitors strip 10 motion by providing a pulse signal to the controller 250 representing when the strip 10 travels a finite distance as measured by the angular rotation of the encoder 230. This finite distance is a small fraction of the DX code 12 bit size. An arrow 34 from the encoder 230 to the strip 10 is shown in FIG. 2 to represent this distance measuring function of the encoder 230. The encoder may alternatively be a wheel frictionally coupled to and moving with the strip 10 having 2000 increments/revolution to provide fine distance resolution. Operation of the encoder 230 will be discussed later in reference to FIGS. 5 and 6.

The controller 250 contains a computer operating a program for controlling the system 20 and processing data from the circuits 200, 210 and 220. The controller 250 operates responsive to the signals received from the splice sensor circuit 200, perforation sensor circuit 210, and detector circuit 220. The controller 250 also measures the width of DX code 12 bits or fat bits 14 using an encoder counter in the controller 250, which provides a running count of the number of pulses received from the encoder 230. Memory 240 is addressable by the controller 250 for storing data representing the minimum and maximum width values of a fat bit, which provides a width range of a valid fat bit to compare against measured fat bits. These values may be stored in terms of the number of pulses from the encoder 230, which correspond to width values. A fat bit counter in the controller 250 counts the number of valid fat bits found in the fat bit zone 15 of a frame 11 of the strip 10. A zone counter in the controller 250 counts the encoder pulses from a detected metering perforation. Memory 240 also stores data representing the number of encoder pulses from the metering perforation to where the fat bit zone 15 starts, and where the fat bit zone 15 ends. This data is checked by the controller 250 against the zone counter to determine when fat bit 14 reading should take place.

The controller also provides an output data signal representing the detected DX code 12 and/or fat bits 14 for each frame 11 of each order of the strip 10. This output data may be sent to a high speed printer for producing prints according to the read information from the DX codes 12 and/or fat bits 14 codes.

Figure 3:
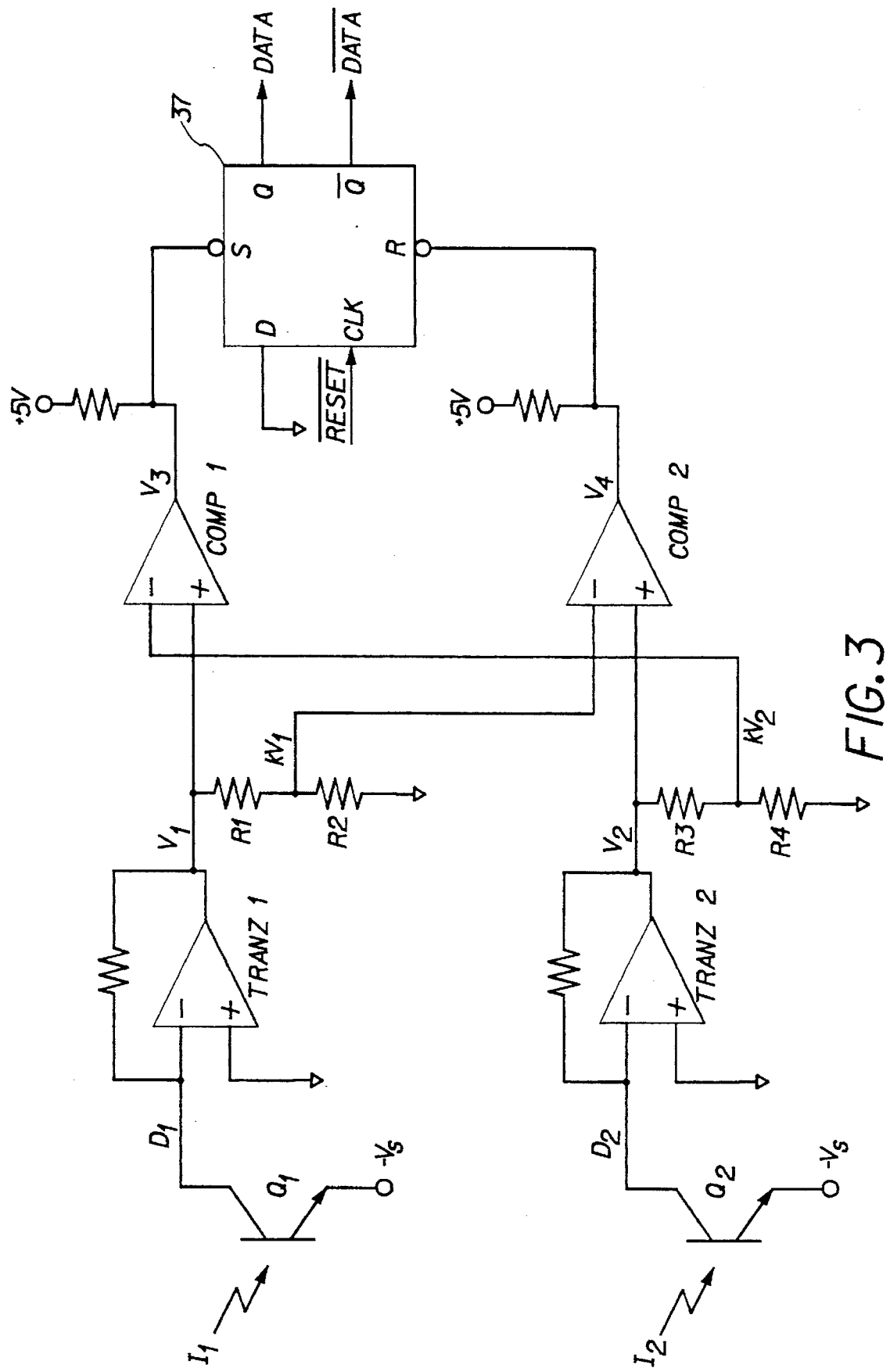
FIG. 3 is an electrical schematic diagram of the detector circuit and its associated sensors shown in FIG. 2.

FIG. 3 shows an electrical diagram of detector circuit 220 of FIG. 2 having inputs $D_1$ and $D_2$ from transistors $Q_1$ and $Q_2$. Transistor $Q_1$ represents photo-detector 25, and $I_1$ represents the current producing light (intensity of illumination) received at photo-detector 25 through the strip 10 from the LED 28. Transistor $Q_2$ represents either photo-detector 26 or 27 depending on multiplexer 29's setting (multiplexer not shown in FIG. 3), and $I_2$ represents the current producing light received by photo-detector 26 or 27, respectively, through the strip 10 from the LED 28. $I_1$ and $I_2$ correspond to the density of the strip and vary in amplitude according to the amount of light received by the photo-detectors 25, and 26 or 27, respectively. This light will be received either via a light or dark density region on the edge 13 of the strip 10. Thus, $I_1$ and $I_2$ may either be at $I_L$, representing the current from either $Q_1$ or $Q_2$ when the respective photo-detector sense a dark density region, or at $I_H$, when sensing a light density region.

A transimpedance amplifier (TRANZ1) converts the $D_1$ current from $Q_1$ into voltage $V_1$. A second transimpedance amplifier (TRANZ2) converts the $D_2$ current from $Q_2$ into voltage $V_2$. TRANZ1 and TRANZ2 may both be of LF444 type integrated circuit chips. A comparator (COMP1) receives $V_1$ at its positive input, and voltage $kV_2$ at its negative input. A second comparator (COMP2) receives $V_2$ at its positive input, and voltage $kV_1$ at its negative input. The threshold constant k has a value between 0 and 1. A voltage divider composed of R1 and R2 is connected to $V_1$ to provide $kV_1$ to the negative input of COMP2 from a connection between R1 and R2. Similarly, a second voltage divider composed of R3 and R4 is connected to $V_2$ to provide $kV_2$ to the negative input of COMP1.

Resistor pairs, R1, R2, and R3, R4, are selected to have resistance values to provide k between 0 to 1 for voltages $kV_1$ and $kV_2$. Voltages $kV_1$ and $kV_2$ are threshold voltage levels and are necessary for proper operation of comparators COMP1 and COMP2 during reading of fat bits 14 or DX code 12 bits. The constant k for these voltages is empirically determined according to the minimum density ($D_{MN}$) and maximum density ($D_{MAX}$) for the fat bits on the strip 10, while assuring that the worst case fuzzy fat bit is above the noise density level. Once constant k has been selected for fat bits 14 it will also provide voltages $kV_1$ and $kV_2$ suitable for reading the sharper density transitions of DX code 12 bits.

COMP1 operates by outputting voltage $V_3$, which will be at a high level when COMP1's positive input voltage is greater than its negative input voltage, and at a low level when COMP1's positive input voltage is less than its negative input voltage. COMP2 operates similarly to produce output voltage $V_4$. COMP1 and COMP2 may both be LM339 type integrated chips.

A D type serf reset flip-flop 37 receives $V_3$ at an inverted S input, and $V_4$ at an inverted R input. Outputs DATA and $\overline{\text{DATA}}$ are shown, although only DATA is shown as connected to the controller 250 (FIG. 2). Alternately however the inverted output $\overline{\text{DATA}}$ may be sent to the controller 250, and the controller 250 accordingly programmed.

Input D to flip-flop 37 is grounded such that the output DATA will be at a high level when flip-flop 37 is set, and a low level when the flip-flop 37 is reset. Clock input (CLK) is connected to the $\overline{\text{RESET}}$ output of the controller 250, which is used by the controller 250 to reset flip-flop 37 to a low DATA level. This flip-flop 37 may be of a SN74ALS74 type. Because voltage levels at the inputs to COMP1 and COMP1 may at times be too close for accurate comparator COMP1 and COMP2 operation, a hysteresis circuit (not shown in FIG. 3) may be added to each comparator. Such a circuit provides for feedback of part of the output voltage of a comparator to one of its inputs, such that there will always be a voltage difference between its two inputs.

During reading of fat bits 14, detector circuit 220 receives inputs signals on $D_1$ and $D_2$ from photo-detectors 25 and 27, respectively, while the fat bit zone 15 on edge 13 is being transferred over photo-detectors 25 and 27. The detector circuit 220 operates in the same way for reading DX code 12 bits as for fat bits 14, except that circuit 220 receives on $D_2$ signals from photo-detector 26 rather than from photo-detector 27 while the DX code 12 on edge 13 is being transferred over photo-detectors 25 and 26. To reiterate, the selecting of photo-detector 26 or 27 is enabled by the controller 250 via signals to multiplexer 29. The multiplexer 29 is set by controller 250 to transmit signals to the $D_2$ input of circuit 220 from photo-detector 27 during fat bit reading, and from photo-detector 26 during DX code 12 reading. For purposes of discussion, operation of the circuit 220 will hereinafter be described in connection with fat bit 14 reading using the sensor pair of photo-detector 25 and 27.

Figure 4:
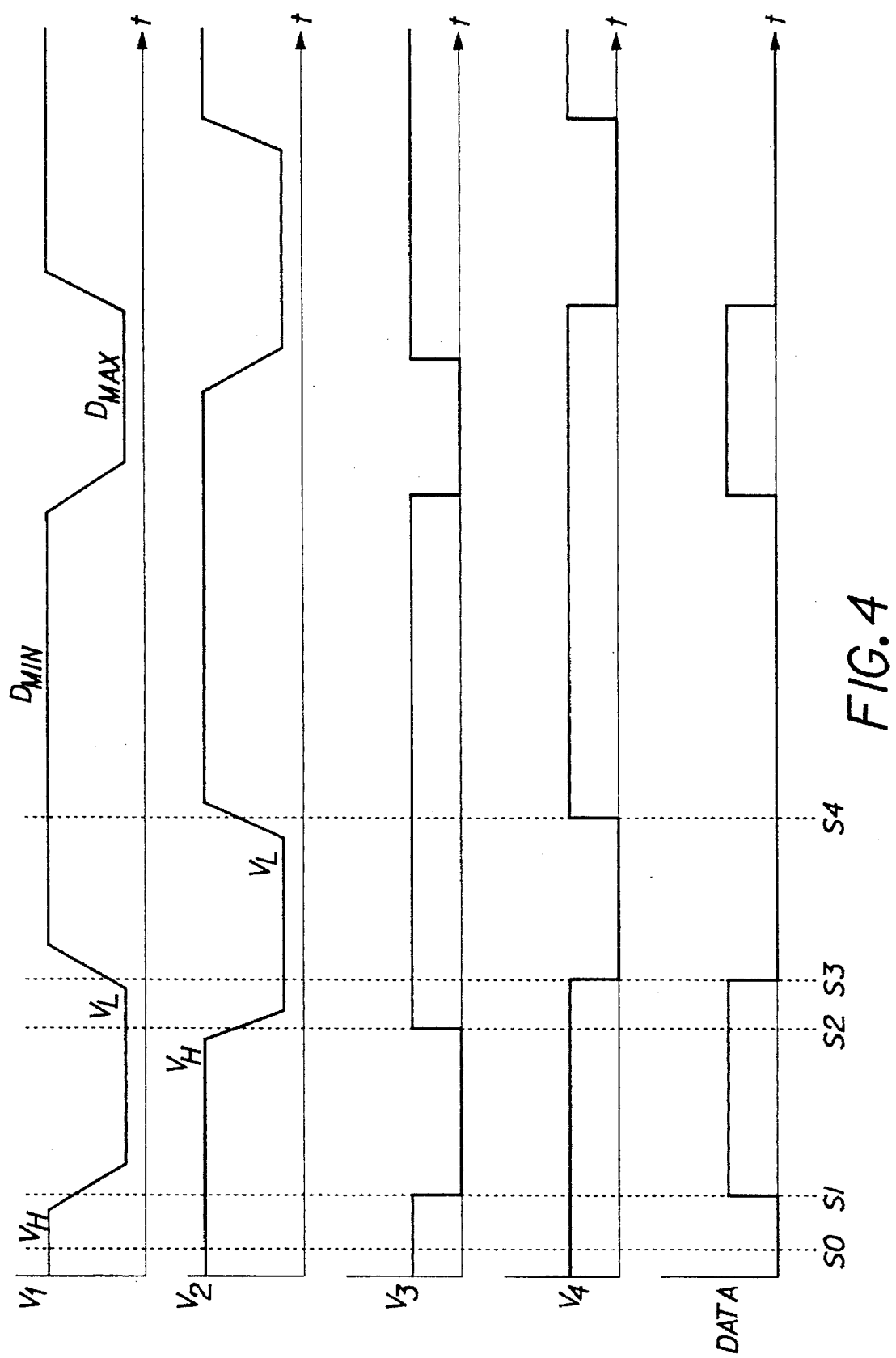
FIG. 4 is a timing diagram illustrating the operation of the detector circuit of FIGS. 2 and 3.

Operation of the detector circuit of FIGS. 2 and 3 is shown in the timing diagram of FIG. 4. FIG. 4 shows five states of detector circuit operation denoted as S0, S1, S2, S3, and S4. State 0 represents the case when no fat bits are detected at either photo-detector 25 or photo-detector 27, hence $V_1$ and $V_2$ are both at high voltage level, $V_H$. COMP1 and COMP2 outputs, $V_3$ and $V_4$ respectively, are high since their positive inputs are at a greater voltage ($V_H$) than their negative inputs ($kV_H$).

At State 1, photo-detector 25 detects the leading edge of a fat bit as the fat bit moves across photo-detector 25, and hence $V_1$ changes to voltage $V_L$. Photo-detector 27 has not yet detected the fat bit since photo-detector 25 is located before photo-detector 27 in the path of the strip. COMP1 output, $V_3$, now goes low, because COMP1's positive input voltage is at $V_L$, which is less than its negative input voltage at $kV_H$. This sets the flip-flop 37, and DATA goes high. $V_4$ remains unchanged. DATA will now remain high until the flip-flop 37 is reset.

At State 2, photo-detector 27 detects the leading edge of the fat bit which is still being detected by photo-detector 25, thus $V_2$ changes to voltage $V_L$. COMP1 output voltage $V_3$ returns to a high level, since COMP1's positive input voltage is at $V_L$, which is greater than its negative input voltage $kV_L$. $V_4$ remains unchanged. Note that both photo-detector 25 and photo-detector 27 detect the fat bit at the same time because they are spaced apart by a distance less than the minimum width of a fat bit. (The same occurs during DX code reading using the sensor pair of photo-detectors 25 and 26, since photo-detectors 25 and 26 detect a DX code 12 bit at the same time because they are optimized to be spaced apart by a distance less than the minimum DX code bit width.)

At State 3, photo-detector 25 detects the trailing edge of the fat bit which is still being detected by photo-detector 27, hence $V_1$ changes to voltage $V_H$. $V_3$ remains unchanged at high since COMP1's positive input voltage ($V_H$) is still greater than negative input voltage ($kV_L$). COMP2's output, $V_4$, changes to a low level because COMP2's positive input voltage ($V_L$) is less than its negative input voltage ($kV_H$). In response to this low level of $V_4$, the flip-flop 37 resets to change DATA to a low level.

Finally at State 4, photo-detector 27 detects the trailing edge of the fat bit, and $V_2$ changes to $V_H$. This places the detector circuit back at starting State 0. In this manner, the detector circuit outputs DATA responsive to both photo-detector 25 and photo-detector 27 signals (i.e., currents to TRANZ1 and TRANZ2) representing a fat bit.

Figure 5:
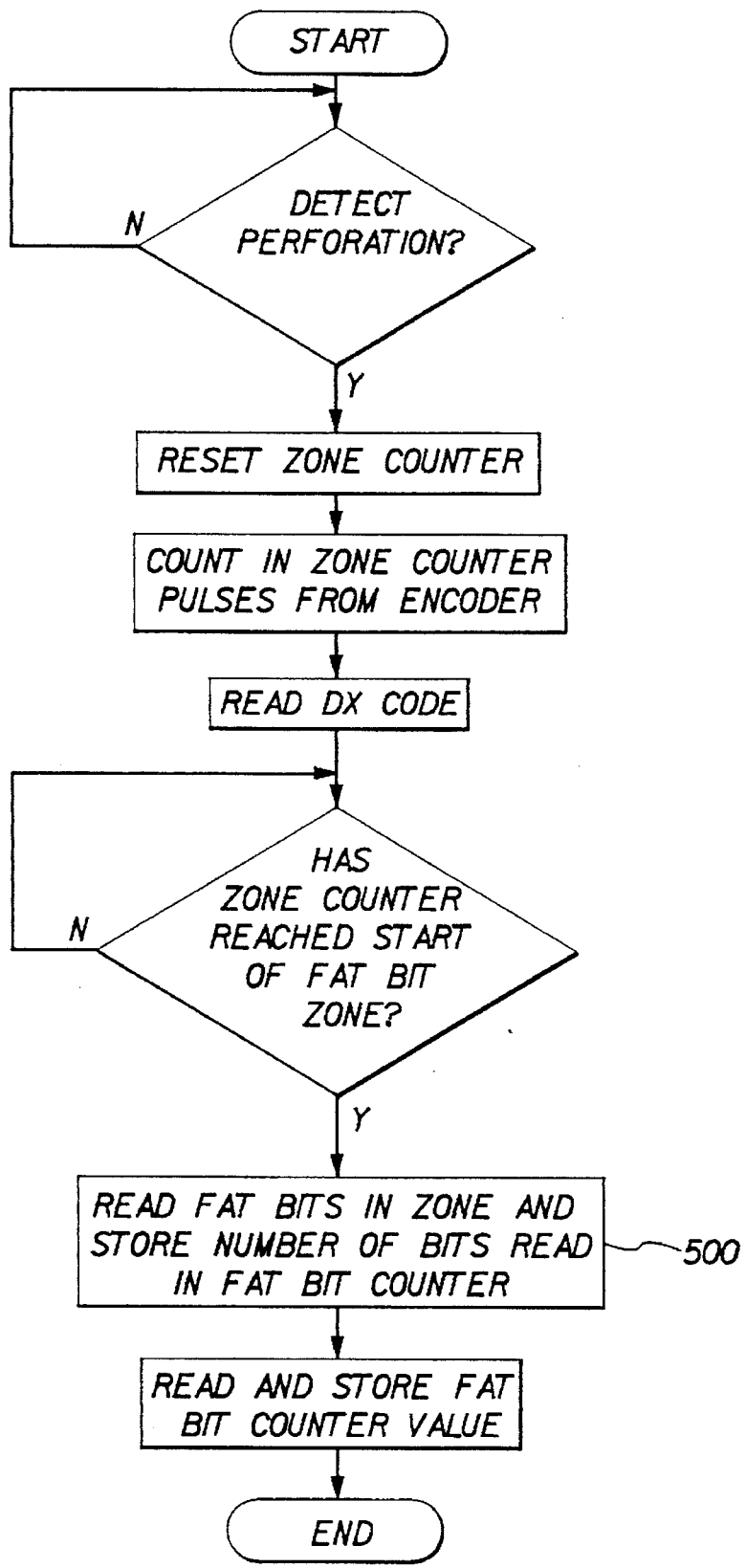
FIG. 5 is a flow chart showing the operation of the system of FIG. 2 for reading DX codes and fat bits.
Figure 6:
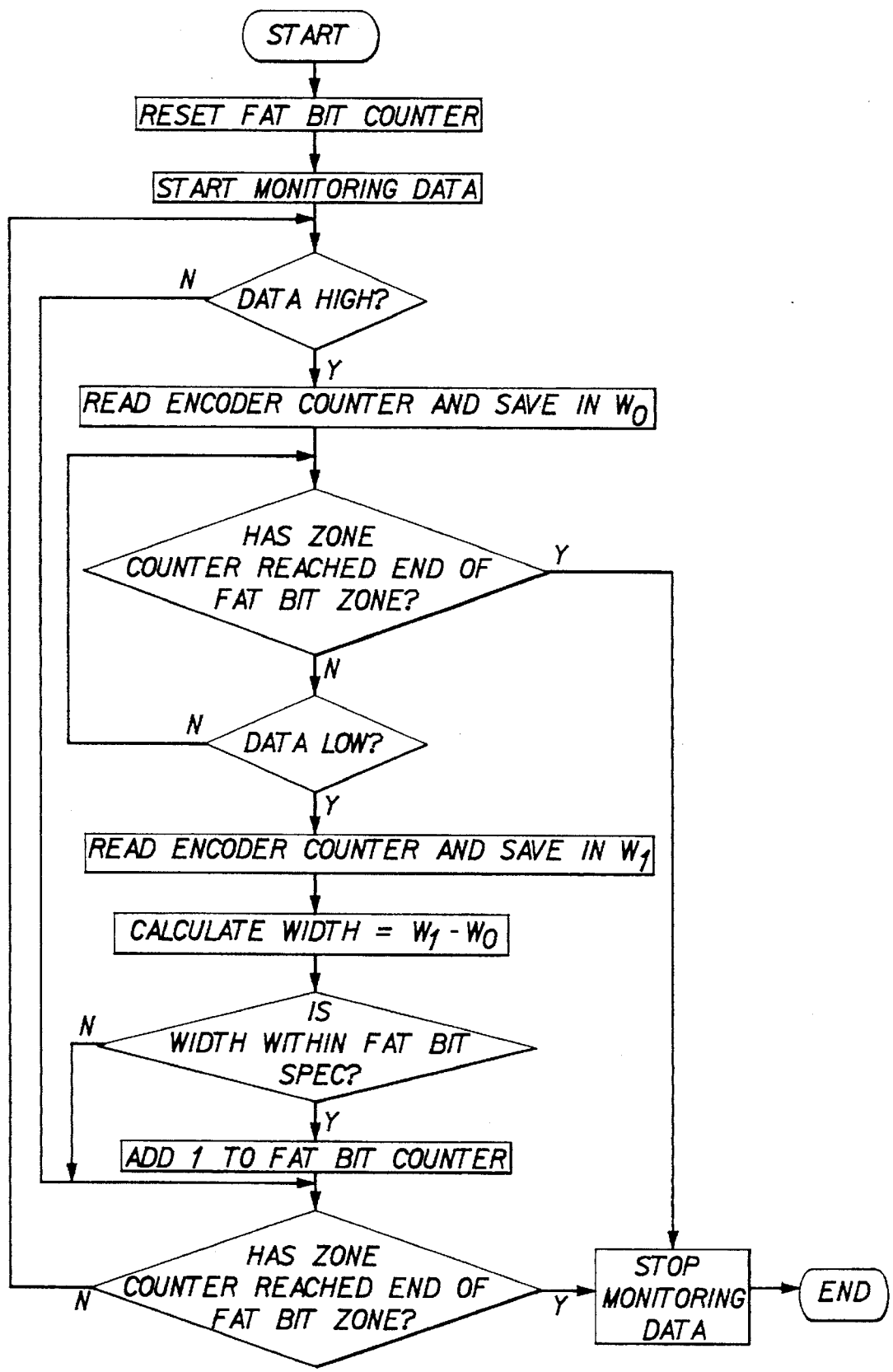
FIG. 6 is a flow chart showing the operation of Step 500 in FIG. 5.

The operation of the system under program control is shown in the flow charts of FIGS. 5 and 6. In FIG. 5, the controller 250 first waits for a metering perforation 18 to be detected via the signal from the perforation detector circuit 210. The anticipation perforation 16 may be used by the controller 250 to validate that the next perforation is a metering perforation 18. Upon detecting the metering perforation 18, the zone counter in the controller 250 is reset, and the zone counter starts counting pulses from the encoder 230. Controller 250 sets the multiplexer 29 to send the signal from photo-detector 26 to the $D_2$ input of the detector circuit 220. Next, the DX code 12 is read by the controller 250 along the frame 11 having the detected perforation using the detector circuit 220. This is achieved by measuring the width of each DX code 12 bit component in terms of encoder 230 pulses while DATA corresponding to the DX code 12 bit component from the detector circuit 220 is HIGH. DX code 12 bit measuring is the same as measuring the width of fat bits 14 except sensor pair of photo-detectors 25 and 26 provide inputs $D_1$ and $D_2$ to detector circuit 220, and reading occurs over the DX code 12 on edge 13. (Measuring of fat bit 14 width will be shown in reference to FIG. 6.) The controller 250 may also determine when to start and stop reading DATA representing the DX code 12 relative to the detected perforation using the zone counter, where data has been provided in the memory 240 to represent in terms of encoder 230 pulses, the distance between the detected perforation to the DX code 12 region on the edge 13.

After reading the DX code 12, the controller 250 sets with multiplexer 29 the signal from photo-detector 27 to the $D_2$ input of the detector circuit 220. The controller 250 then determines whether the fat bit zone 15 has been entered by checking if the zone counter has reached the data in the memory 240 representing the number of pulses from the encoder 230 to the start of the fat bit zone 15 from the metering perforation 18. Upon entering the zone, the detector circuit 220 reads the number of fat bits in the zone 15, and stores the number of bits read in the fat bit counter (Step 500). Step 500 will be discussed in further detail in connection with FIG. 6. Last, the fat bit counter for the frame 11 is read and stored.

At anytime during the operation, if the splice sensor circuit 200 sends a signal to the controller 250 indicating the presence of a splice, the controller 250 issues a signal along $\overline{RESET}$ to the detector circuit 220, which resets the flip-flop 37 so DATA is LOW. Since detection of a splice indicates a new order on the strip 10, this assures that the detector circuit 220 is ready for the strip of the new order. The controller stores the value of the fat bit counter and the read DX code for each frame of each order for later output to a printer (not shown).

FIG. 6 shows the operation in the controller 250 for Step 500 in FIG. 5. First, the fat bit counter is reset. The controller 250 then starts monitoring the DATA line from the detector circuit 220. When DATA changes from a LOW to HIGH level, the value in the encoder counter is read and saved into $W_o$; otherwise, the controller 250 waits for DATA to go HIGH until the strip 10 has exited the fat bit zone 15 and DATA monitoring stops. The controller 250 checks whether the zone 15 is exited by comparing the zone counter to the end of zone data in memory 240.

With a value in $W_o$, the controller 250 checks if the fat bit zone 15 has been exited, and if DATA has changed to a LOW state. If the strip 10 is still within the zone 15, and DATA goes to LOW, the encoder counter is again read and saved in $W_1$. The controller 250 then calculates the width of the bit read by subtracting $W_o$ from $W_1$ and storing the resulting value in WIDTH. If WIDTH is within the fat bit specification, i.e., the minimum and maximum fat bit width stored in memory 240, a 1 is added to index the fat bit counter because a valid fat bit has been read. If WIDTH is outside the fat bit specification, the fat bit counter is not indexed since the read fat bit is not considered valid. The controller 250 thereafter checks if the fat bit zone 15 has been exited. DATA will continue to be monitored until the fat bit zone 15 is exited, otherwise the controller 250 will continue to read and count fat bits as described above.

In the alternative to a running encoder counter and the above WIDTH calculation, a counter in the controller 250 could be reset when DATA changes from LOW to HIGH, and then indexed for each pulse from the encoder 250 until DATA changes from HIGH to LOW. The value in this counter would represent the fat bit width, WIDTH, and can thereafter be checked to determine if WIDTH is within the fat bit specifications of a valid fat bit.

As stated earlier, the method of reading fat bits may also be applied to reading DX codes while photo-detectors 25 and 26 cross the DX code 12 of a frame 11. Operation is the same as in FIG. 6 except that no fat bit counter is used, and preferably no check of WIDTH against a width specification is performed. The widths measured for each DX code 12 bit read are stored in sequence in a buffer in the controller 250 for later decoding. However, verification of the width of a DX code 12 bit can be performed prior to storage in the buffer by including a step of checking the measured WIDTH against a specification range for a valid DX code 12 bit stored in memory 240. Such a verification step may prevent reading a false DX code 12 bit on strip 10. Alternatively, the DX code 12 reading function may be incorporated into controller 250, such that a signal from either photo-detector 25, 26, or 27 is received by controller 250, and the controller is programmed to receive and decode the DX code 12 data.

Use of this invention offers several improvement to reader reliability. First, the use of encoder 230 to monitor film motion for measuring fat bit 14 widths, and comparing the width to a minimum and maximum width, minimizes the event of false fat bit reads which would be outside this width range, such as caused by scratches and edge fog. Also, the use of the encoder 230 allows for reading fat bits 14 only in specific fat bit zones 15 based on detected perforation. This feature substantially reduces the scanned in-track film length. Further, since reading is responsive to encoder 230 pulses, this eliminate erroneous detected output when film motion is not present.

The use and orientation of the two photo-detectors 25 and 27 at a spaced distance apart provides the advantage of being able to detect transitions of softly imaged fat bits. If photo-detectors 25 and 27 were too close, their compared density differences would not be sufficiently significant to trigger a transition in DATA. Further, the larger sensor area provided by the two photo-detectors 25 and 27, as compared to detectors in a typical DX reader, provides more reliability to the reader because of the filtering out of film scratches and variations in code density. Also, the increased separation between photo-detectors 25 and 27, in combination with larger fat bit width, optimizes the detection area for reading fat bits.

From the foregoing description, it will be apparent that there has been provided an improved code reader for reading fat bit codes exposed on film in a camera, as well as for reading DX codes on film. Variations and modification in the herein described reader in accordance with the invention, will undoubtably suggest themselves to those skilled in the art. Accordingly, the foregoing description should be taken as illustrative and not in a limiting sense.

PARTS LIST

10 Film Strip
11 Frame of Strip
12 DX Code
13 Boundary Edge Having DX and Fat Bits Codes
14 Fat Bits
15 Fat Bits Zone
16 Anticipation Perforation
18 Metering Perforation
20 The System
21 Splice Sensor
22 LED Associated With Splice Sensor
23 Perforation Sensor
24 LED Associated With Perforation Sensor
25 Photo-Detector
26 Photo-Detector
27 Photo-Detector
28 LED Associated With Photo-Detectors 1 and 2
29 Multiplexer PARTS LIST -continued 30 Film Transport Mechanism
31 Metering Roller
32 Path of Film Strip
33 Dashed Line Representing coupling of Encoder to Strip Transport Mechanism
34 Arrow Representing Encoder Measuring Function
35 Nip Roller
37 Flip-Flop
200 Splice Sensor Circuit
210 Perforation Sensor Circuit
220 Detector Circuit
230 Encoder
240 Memory
250 Controller

We claim:

1. A reader for reading fat bits on film in the form of a strip of film with one or more frames having a boundary edge with sufficient space containing one or more fat bits for each frame, said reader comprising:
   a light source for directing light through said strip,
   a pair of optical sensors for receiving light from said light source passing through said boundary edge of said strip, said sensors each providing an output signal corresponding to the intensity of said received light representative of the presence and absence of said fat bit on said boundary edge, and said sensors are spaced from each other,
   means for moving said strip so that said boundary edge of said strip passes along a path across said pair of sensors and between said light source and said sensors, and
   means responsive to said output signals of both said sensors for measuring the width of each said fat bit as said strip passes said sensors, said measuring means comprising means responsive to the distance said strip moves by said moving means for determining a displacement of said strip corresponding to the width of each said fat bit.

2. The reader according to claim 1 further comprising:
   means for verifying that said measured width of said fat bit is within a range of a valid fat bit.

3. The reader according to claim 2 further comprising:
   means for counting the number of fat bits verified by said verifying means.

4. The reader according to claim 2 where said sensors are spaced from each other at a distance less than the minimum width of said valid fat bits.

5. The reader according to claim 1 wherein said means responsive to said distance comprises an encoder responsive to the movement of said strip for providing signals representing the displacement of said strip, and means for translating said encoder signals into a representation of the width of said fat bits.

6. The reader according to claim 1 where said light source is an LED.

7. The reader according to claim 1 where each said sensor is a separate photo-detector.

8. The reader according to claim 1 wherein said strip has perforations associated with each said frame and further comprises means for locating zones on said boundary edge containing said fat bits relative to said perforations.

9. The reader according to claim 1 where said means for measuring said width comprises:
   a detector for receiving said output signals from said pair of sensors which produces an output corresponding to said signals from said sensors representing each said fat bit, a controller for receiving said output of said detector, an encoder coupled to said moving means for providing output signals to said controller representing displacements of said strip, and said controller having means operative while receiving said output from said detector representing each said fat bits for translating said encoder output signals into signals representing the width of said fat bit.

10. The reader according to claim 2 further comprising:

said pair of optical sensors including first and second optical sensors along said path of said strip, a third optical sensor located between said first and said second optical sensors for receiving light from said light source passing through said boundary edge of said strip, said first and said third sensors each providing an output signal corresponding to the intensity of said received light from DX code bits located on said boundary edge for each said frame, wherein said first and third sensors are spaced from each other by a distance less than the minimum width of said DX code bits, and said means for measuring the width of each said fat bit further comprise means responsive to said output signals of said first and said third sensors for measuring the width of each said DX code bit as said strip passes said first and third sensors, said measuring means comprising means responsive to the distance said strip moves by said moving means for determining a displacement of said strip corresponding to the width of each said DX code bit.

11. The reader according to claim 10 further comprising means for storing said measured widths of said DX code bits.

12. The reader according to claim 10 where said means for measuring said width of said DX code bit comprises:

a detector for receiving said output signals from said first and said third sensors, and producing an output corresponding to said signals from said sensors representing said DX code bit, a controller for receiving said output of said detector, a multiplexer for receiving said output signals from the second and third sensors responsive to said controller for selecting said third output signals from one of said second and said third output signals and coupling the second sensor to be said detector, an encoder coupled to said moving means for providing output signals to said controller representing displacements of said strip, and said controller responsive to said output of said detector representing each said DX code bit for translating said encoder output signals into signals representing the width of said DX code bit.

13. A method for reading fat bits on the boundary edge of a strip of film having one or more frame comprising the steps of:

moving said strip along a path across sensing stations which are at two locations along said path, directing light towards said boundary edge of said strip, generating at said two locations signals corresponding to the intensity of said light passing through the boundary edge of said strip, where said locations are spaced from each other at a distance less than the minimum width of said fat bits, and measuring the width of each said fat bit on said boundary edge of said strip while said strip moves along said path across said sensing stations, wherein said measuring step comprises determining a displacement of said strip, responsive to the distance said strip moves along said path, corresponding to the width of each said fat bit.

14. The method according to claim 13, further comprising the step of verifying that said measured width of said fat bit is within a expected range corresponding to a valid fat bit.

15. The method according to claim 14 further comprising the step of counting the number of verified fat bits.

16. The method according to claim 13 wherein said sensing stations comprise first and second locations, and a third location between said first and said second locations, and said method further comprising the steps of:

said moving step includes moving said strip along a path across said first, said third, and said second stations, generating at said first and said third locations signals corresponding to the intensity of said light passing through the boundary edge of said strip, wherein said first and third locations are spaced by a distance less than the minimum width of DX code bits, and measuring the width of each said DX code bit on said boundary edge of said strip while said strip moves along said path across said first and said third sensing stations, wherein said measuring step comprises determining a displacement of said strip, responsive to the distance said strip moves along said path, corresponding to the width of each said DX code bit.

17. The method according to claim 16 further comprising storing in a buffer one or more said measured width of DX code bits.

* * * * *